(No Model.)

A. H. TREGO.
BRIDLE BIT.

No. 332,571. Patented Dec. 15, 1885.

WITNESSES:
A. P. Grant,
W. F. Kircher

INVENTOR:
A. Homer Trego,
BY John A. Wiedersheim
ATTORNEY.

UNITED STATES PATENT OFFICE.

A. HOMER TREGO, OF PHILADELPHIA, PENNSYLVANIA, ASSIGNOR OF THREE-FOURTHS TO EDWARD L. SMITH, JONAS STEELMAN, JR., AND ALBERT DE CERNEA, ALL OF SAME PLACE.

BRIDLE-BIT.

SPECIFICATION forming part of Letters Patent No. 332,571, dated December 15, 1885.

Application filed October 8, 1885. Serial No. 179,352. (No model.)

*To all whom it may concern:*

Be it known that I, A. HOMER TREGO, a citizen of the United States, residing in the city and county of Philadelphia, State of Pennsylvania, have invented a new and useful Improvement in Bridle-Bits, which improvement is fully set forth in the following specification and accompanying drawings, in which—

Figure 1:
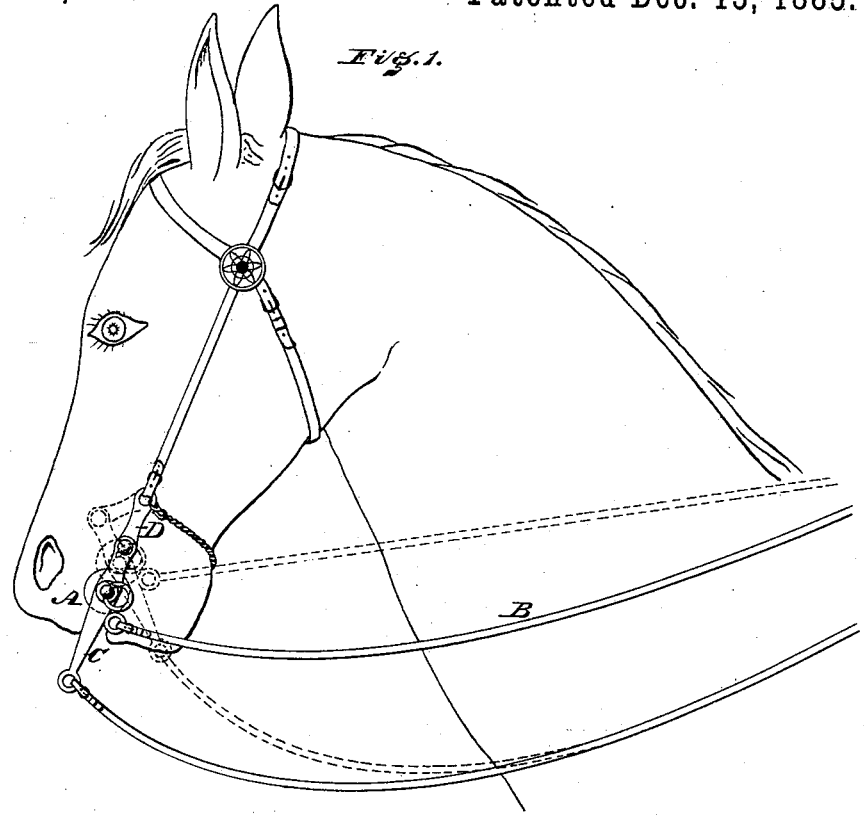
Figure 2:
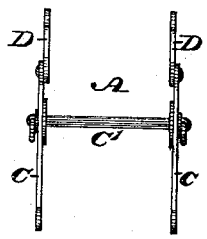

Figure 1 represents a side elevation of a bridle-bit embodying my invention. Fig. 2 represents a front view thereof.

Similar letters of reference indicate corresponding parts in the two figures.

My invention consists of a bridle-bit formed with jointed bars or toggles on the sides thereof, whereby the animal may be gently but powerfully controlled, as will be hereinafter fully set forth.

Referring to the drawings, A represents the bit, which is connected with the cheek-straps B of a headstall, said bit being formed of the side pieces, C, mouth-piece C', and bars D. The bars D are pivoted or jointed to the upper ends of the side pieces, C, and form upward continuations thereof.

It will be seen that when the lines, reins, or bridle are drawn back the bit is forced against the lower jaw of the animal, and as the side pieces, C, and bars D form toggle-levers, the mouth-piece is drawn up into the upper corners of the mouth, while, however, continually exerting its pressure on the lower jaw as it ascends, so that the animal is gently but firmly controlled and prevented from taking hold of the mouth-piece by his teeth.

As the mouth-piece ascends and retains its fulcrum on the mouth of the animal the bars D are drawn downward and forward, thus tightening the cheek-straps and connected parts of the headstall and exerting a downward pressure on the head, without, however, disarranging the headstall, said pressure, added to that on the lower jaw, serving to control the animal quickly and without severity, the bit acting with double leverage to force the mouth-piece rearward against the lower jaw of the animal and draw down the cheek-straps and tighten the headstall without displacing the same, these operations being assisted by the chin or curb chain or strap, which serves to prevent forward motion of the lower ends of the cheek-straps and permit rolling motions of the bit and the zigzag or toggle action of the sides thereof.

Having thus described my invention, what I claim as new, and desire to secure by Letters Patent, is—

1. A bridle-bit having side pieces with bars pivotally secured to said pieces above the mouth-piece, substantially as described.

2. The side pieces, C, and mouth-piece C', in combination with the bars D, pivotally secured to said side pieces, and a curb-chain connected with said side pieces, substantially as described.

A. HOMER TREGO.

Witnesses:
JOHN A. WIEDERSHEIM,
A. P. GRANT.